(12) United States Patent
Ito et al.

(10) Patent No.: US 8,698,685 B2
(45) Date of Patent: Apr. 15, 2014

(54) ANTENNA DEVICE

(75) Inventors: Hiromitsu Ito, Kyoto-fu (JP); Hiroyuki Kubo, Shiga-ken (JP); Kuniaki Yosui, Kyoto-fu (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 761 days.

(21) Appl. No.: 12/819,853

(22) Filed: Jun. 21, 2010

(65) Prior Publication Data

US 2010/0321267 A1 Dec. 23, 2010

(30) Foreign Application Priority Data

Jun. 22, 2009 (JP) ................................. 2009-147496

(51) Int. Cl.
*H01Q 7/08* (2006.01)

(52) U.S. Cl.
USPC ............................................................ 343/788

(58) Field of Classification Search
USPC .......................................................... 343/788
See application file for complete search history.

(56) References Cited

U.S. PATENT DOCUMENTS

| | | | | |
|---|---|---|---|---|
| 7,280,076 | B2 * | 10/2007 | Ninomiya et al. | 343/702 |
| 7,812,777 | B2 | 10/2010 | Yosui et al. | |
| 8,199,066 | B2 * | 6/2012 | Kubo et al. | 343/895 |
| 8,256,684 | B2 * | 9/2012 | Sugita et al. | 235/492 |
| 2005/0001031 | A1 * | 1/2005 | Akiho et al. | 235/451 |
| 2008/0007473 | A1 * | 1/2008 | Yosui et al. | 343/788 |

FOREIGN PATENT DOCUMENTS

| | | |
|---|---|---|
| JP | 2002-298095 A | 10/2002 |
| JP | 2002-325013 A | 11/2002 |
| JP | 2004-348497 A | 12/2004 |
| JP | 3957000 B1 | 8/2007 |
| JP | 2008-035464 A | 2/2008 |
| JP | 2008-048376 A | 2/2008 |

OTHER PUBLICATIONS

Japanese Office Action "Notice of Reason for Rejection" with mailing date of Sep. 20, 2011; Japanese Patent Application No. 2009-147496 with translation.
The first Office Action issued from the State Intellectual Property Office of People's Republic of China on Jan. 4, 2013, which corresponds to Chinese Application No. 201010209355.3 and is related to U.S. Appl. No. 12/819,953, with an English language summary.
"The Second Office Action" issued by the State Intellectual Property Office (SIPO) of People's Republic of China in Chinese Application No. 201010209355.3 on Nov. 20, 2013, which is related to U.S. Appl. No. 12/819,853; with an English language summary.

* cited by examiner

*Primary Examiner* — Robert Karacsony
(74) *Attorney, Agent, or Firm* — Studebaker & Brackett PC

(57) ABSTRACT

An antenna device includes a circuit board and an antenna coil that includes a flexible board on which plural coil conductors are formed and a magnetic core inserted into through holes provided in the flexible board. In each of the plural coil conductors, a first conductor portion is adjacent to a first principal surface of the magnetic core and a second conductor portion is adjacent to a second principal surface of the magnetic core and are positioned so as not to overlap each other in a normal direction with respect to the first or second principal surfaces. The second conductor portion is located farther from the center of the circuit board than the first conductor portion.

5 Claims, 12 Drawing Sheets

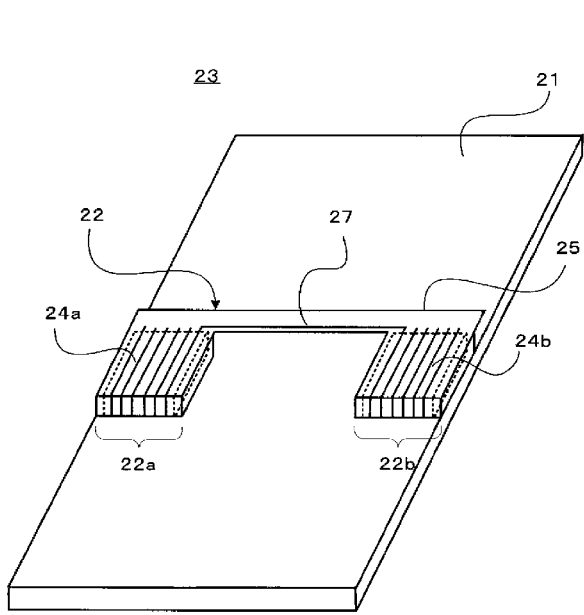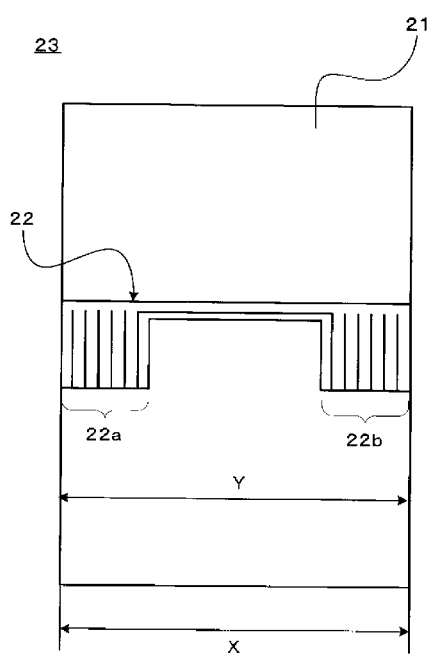
Fig. 1A
Prior Art
Fig. 1B
Prior Art

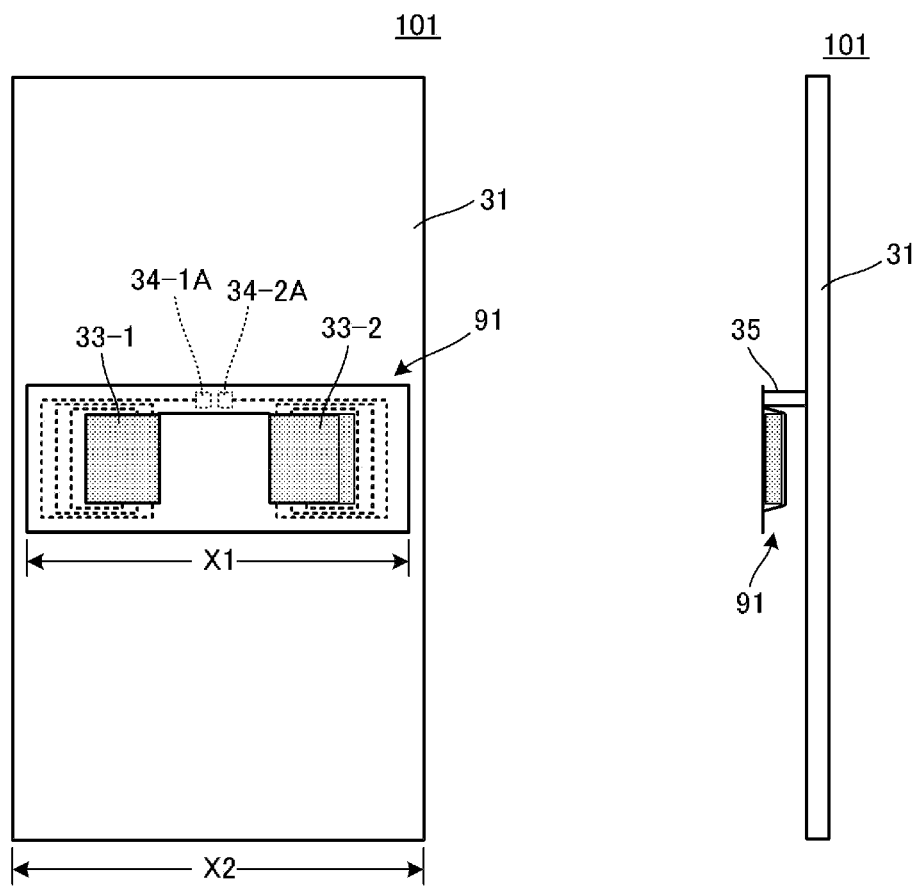
Fig. 3A
Fig. 3C
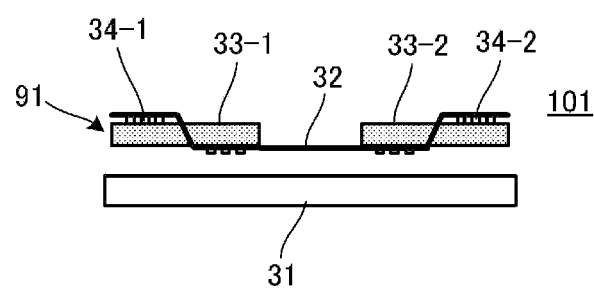
Fig. 3B

ANTENNA DEVICE

CROSS REFERENCE TO RELATED APPLICATIONS

The present application claims priority to Japanese Patent Application No. 2009-147496 filed on Jun. 22, 2009, the entire contents of which are hereby incorporated herein by reference in their entirety.

FIELD OF THE INVENTION

The present invention relates to an antenna device for use in an RFID (Radio Frequency Identification) system that performs communication with an external apparatus by using an electromagnetic signal.

BACKGROUND

In RFID systems that have been in increasing use recently, an antenna for information communication is mounted in each of a mobile communication terminal and a reader/writer, so that data is exchanged between the mobile communication terminal and the reader/writer. In particular, there is a high demand for an antenna mounted in a mobile electronic device to achieve high performance, low cost, and small size. Magnetic antennas that have a magnetic core and achieve such a demand are disclosed in Japanese Patent No. 3957000 (Patent Document 1), Japanese Unexamined Patent Application Publication No. 2002-325013 (Patent Document 2), and Japanese Unexamined Patent Application Publication No. 2002-298095 (Patent Document 3).

FIG. 1A is a perspective view of a magnetic antenna disclosed in Patent Document 1, and FIG. 1B is a plan view of the magnetic antenna. In an antenna device 23 shown in FIGS. 1A and 1B, an antenna coil 22 is mounted on a circuit board 21. On the circuit board 21, the antenna coil 22 is mounted such that lateral edges of the antenna coil 22 coincide with edges of the circuit board 21 in a crosswise direction thereof.

The antenna coil 22 has a first magnetic core 24a, a second magnetic core 24b that is provided so as to be spaced apart from the first magnetic core 24a, and first and second coil portions 22a and 22b that are coaxially wound on the first and second magnetic core 24a and 24b, respectively, in opposite directions.

Patent Document 2 discloses a configuration in which an air-core coil formed on a plane to have a substantially scroll shape, and a plate-like core member inserted into the air-core coil, are included, and the core member is provided so as to be substantially parallel with the plane of the air-core coil.

Patent Document 3 discloses a configuration in which a magnetic body is provided under a loop coil.

In the antenna device disclosed in Patent Document 1, when the interval between the circuit board 21 and the antenna coil 22 increases, the rate of a magnetic flux penetrating in the coil axis direction decreases. Thus, a magnetic field linked with the coil decreases, resulting in deterioration of the coupling coefficient.

In the antenna device disclosed in Patent Document 2, only a magnetic flux passing on one side of a metal plate is linked with the coil. Thus, sufficient communication performance is not obtained.

In the antenna device disclosed in Patent Document 3, when there is a conductor plate under the antenna, the self-inductance of a coil that does not contribute to coupling increases, resulting in deterioration of the coupling coefficient.

SUMMARY OF THE INVENTION

In an exemplary embodiment consistent with the claimed invention, an antenna device comprises a magnetic antenna coil that includes a flexible board on which a first coil conductor and a second coil conductor are formed, and a magnetic core in contact with or adjacent to the flexible board. A conductor plate is disposed, or provided adjacent to the magnetic antenna coil. The first and second coil conductors are disposed, or provided adjacent to both edges, respectively, of the conductor plate in a crosswise direction of the conductor plate. Each of the first and second coil conductors has a first conductor portion adjacent to a first principal surface of the magnetic core and a second conductor portion adjacent to a second principal surface of the magnetic core. The first and second conductor portions are located so as not to overlap each other in a normal direction with respect to the first or second principal surface of the magnetic core. The second conductor portion is located farther from a center of the conductor plate than the first conductor portion.

In another exemplary embodiment consistent with the claimed invention, an antenna device comprises a magnetic antenna coil that includes a flexible board on which a first coil conductor and a second coil conductor are formed, and a magnetic core in contact with or adjacent to the flexible board. A conductor plate is disposed, or provided such that it is separated by a distance from the antenna coil. The first and second coil conductors are disposed, or provided adjacent to both edges, respectively, of the conductor plate in a crosswise direction of the conductor plate. Each of the first and second coil conductors has a first conductor portion adjacent to a first principal surface of the magnetic core and a second conductor portion adjacent to a second principal surface of the magnetic core. The first and second conductor portions are located so as not to overlap each other in a normal direction with respect to the first or second principal surface of the magnetic core. The second conductor portion is located farther from a center of the conductor plate than the first conductor portion.

According to a more specific exemplary embodiment, the magnetic core may be thicker at an edge thereof through which a magnetic flux passes, than at the other portion thereof. Due to this, the magnetic resistance of a magnetic path decreases, and the coupling coefficient with the partner antenna increases.

According to another more specific exemplary embodiment, each of the first and second coil conductor may be formed to have a substantially scroll shape having a conductor opening at a winding center thereof. The flexible board may have, at each conductor opening, a first through hole through which the magnetic core extends, and, at a position outside of a region where each coil conductor is formed, a second through hole through which the magnetic core extends. The magnetic core may extend through the first through hole from the first principal surface of the flexible board and through the second through hole from the second principal surface of the flexible board. The flexible board may be disposed, or provided such that the first principal surface of the flexible board faces the conductor plate. In other words, two holes for inserting the magnetic core therethrough are provided in the flexible board for the magnetic core. Due to this configuration, the adhesion between the flexible board and the magnetic core can be achieved by a single adhesive layer, and thus the cost of parts such as double-sided adhesive tape can be reduced.

According to yet another more specific exemplary embodiment, a magnetic core in contact with or adjacent to the first coil conductor and a magnetic core in contact with or adjacent to the second coil conductor may be provided as a single magnetic core. Due to this, the number of parts is reduced, and thus the manufacturing cost and the parts cost can be reduced.

According to another more specific exemplary embodiment, a ratio of a width of the antenna coil to a width of the conductor plate in the crosswise direction may be greater than 0.7.

Other features, elements, characteristics and advantages of the present invention will become more apparent from the following detailed description of preferred embodiments of the present invention (with reference to the attached drawings).

BRIEF DESCRIPTION OF THE DRAWINGS

FIG. 1A is a perspective view of a magnetic antenna disclosed in Patent Document 1.

FIG. 1B is a plan view of the magnetic antenna shown in FIG. 1A.

FIG. 3A is a plan view of an antenna device including the flexible board shown in FIG. 2.

FIG. 3B is a front view of the antenna device shown in FIG. 3A.

FIG. 3C is a right side view of the antenna device shown in FIG. 3A.

DETAILED DESCRIPTION

Figure 2:
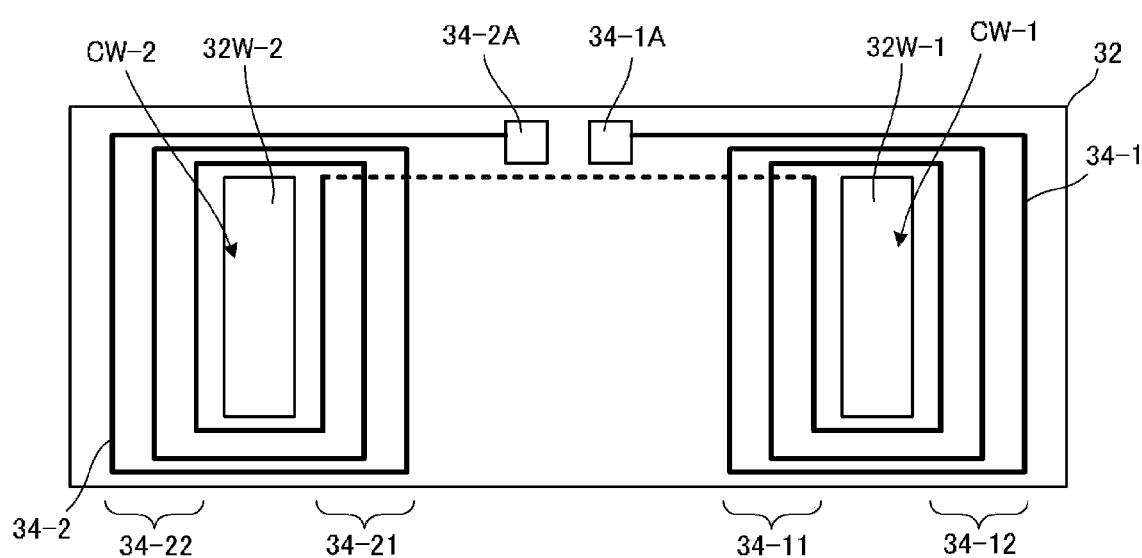
FIG. 2 is a development view of a flexible board that is one component of an antenna device according to a first exemplary embodiment.

An antenna device according to a first exemplary embodiment will be described with reference to FIGS. 2 to 11. FIG. 2 is a development view of a flexible board 32 that is one component of the antenna device according to the first embodiment.

Referring to FIG. 2, substantially scroll-shaped first and second coil conductors 34-1 and 34-2 are formed on the flexible board 32, and have conductor openings CW-1 and CW-2 at winding centers thereof, respectively. In the conductor openings CW-1 and CW-2, through holes 32W-1 and 32W-2 are formed for inserting magnetic cores therethrough, respectively.

The two coil conductors 34-1 and 34-2 are connected in series with each other such that currents generated by magnetic fluxes passing through the conductor openings CW-1 and CW-2 of the two coil conductors 34-1 and 34-2 are in phase. An end of the coil conductor 34-1 is formed as coil conductor connection portion 34-1A and an end of the coil conductor 34-2 is formed as coil conductor connection portion 34-2A.

FIG. 3A is a plan view of the antenna device 101; FIG. 3B is a front view of the antenna device 101; and FIG. 3C is a right side view of the antenna device 101. The antenna device 101 includes an antenna coil 91 and a circuit board 31. As shown in FIG. 2, the antenna coil 91 includes: the flexible board 32 on which the coil conductors are formed; and magnetic cores 33-1 and 33-2. The magnetic core 33-1 and 33-2 are inserted through the through holes 32W-1 and 32W-2, respectively, of the flexible board 32.

The first and second coil conductors 34-1 and 34-2 are disposed, or provided adjacent to both edges, respectively, of the circuit board (conductor plate) 31 in a crosswise direction thereof.

For example, a circuit of a mobile communication terminal can be formed on the circuit board 31. The circuit board 31 corresponds to a conductor plate according to an embodiment of the claimed the invention. Electrodes are provided on the circuit board 31 for electrical connection of the antenna coil 91, and are connected to the coil conductor connection portions 34-1A and 34-2A of the antenna coil 91 via respective pins 35, one of which is shown in FIG. 3C.

Figure 4A:
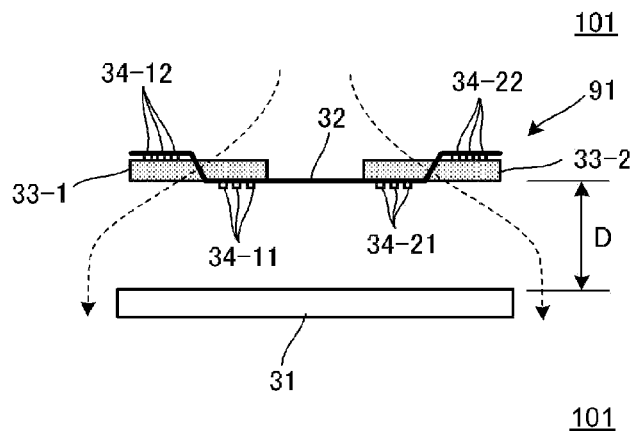
FIGS. 4A and 4B show a magnetic flux of a partner antenna passing through an antenna device.
Figure 4B:
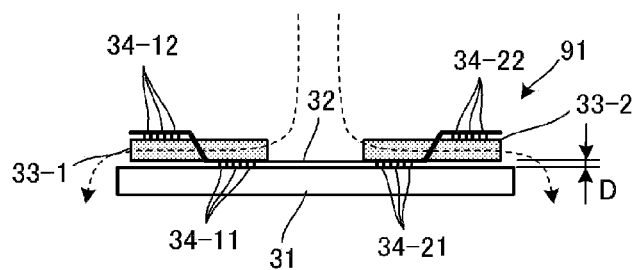
Figure 5:
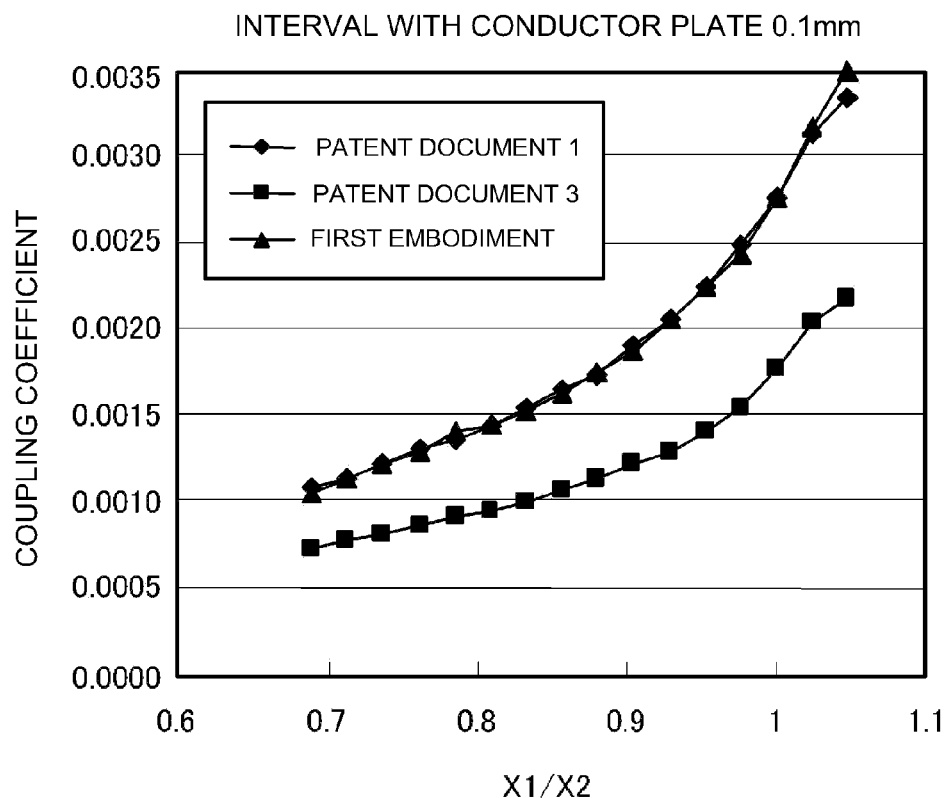
FIG. 5 shows a relation between coupling coefficient and X1/X2 when the interval between a circuit board and an antenna coil changed.
Figure 6:
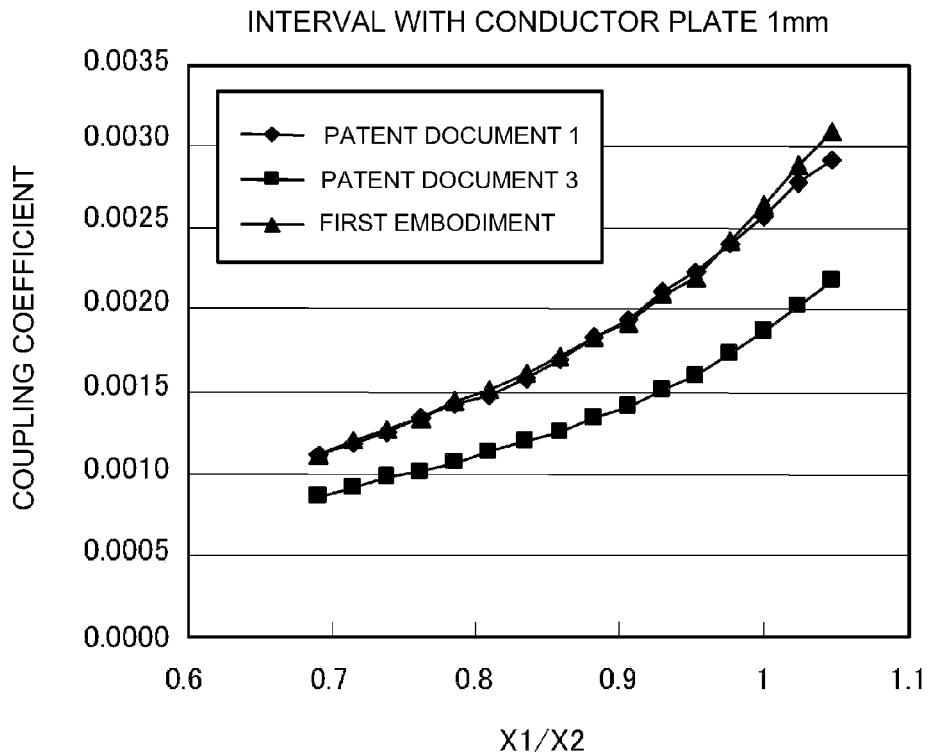
FIG. 6 shows a relation between coupling coefficient and X1/X2 when the interval between the circuit board and the antenna coil is changed.
Figure 7:
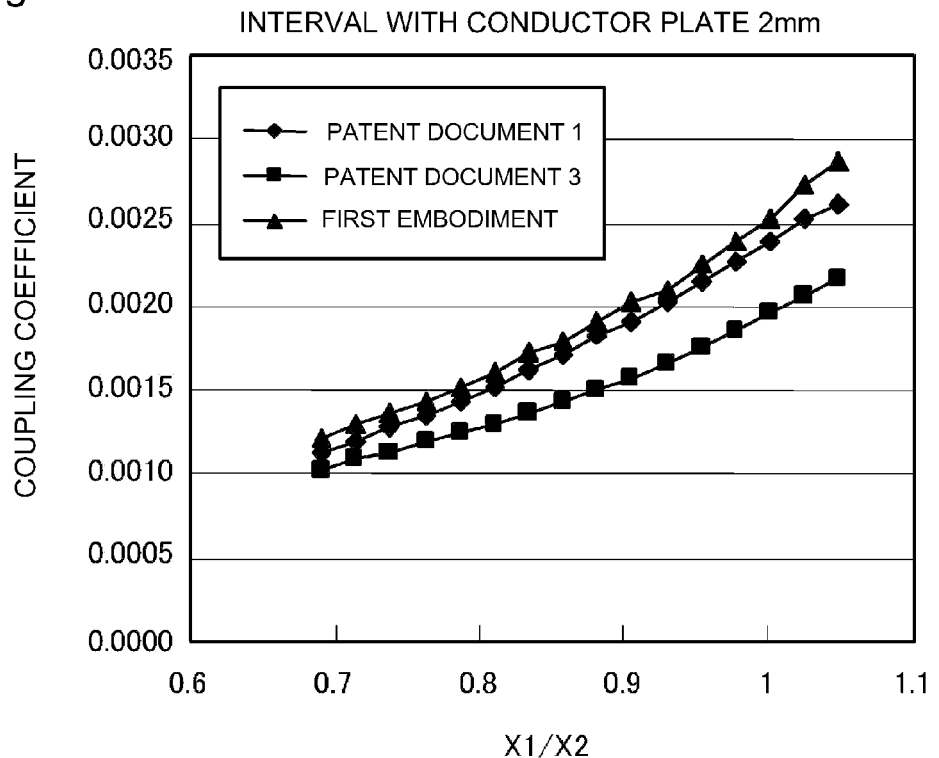
FIG. 7 shows a relation between coupling coefficient and X1/X2 when the interval between the circuit board and the antenna coil is changed.
Figure 8:
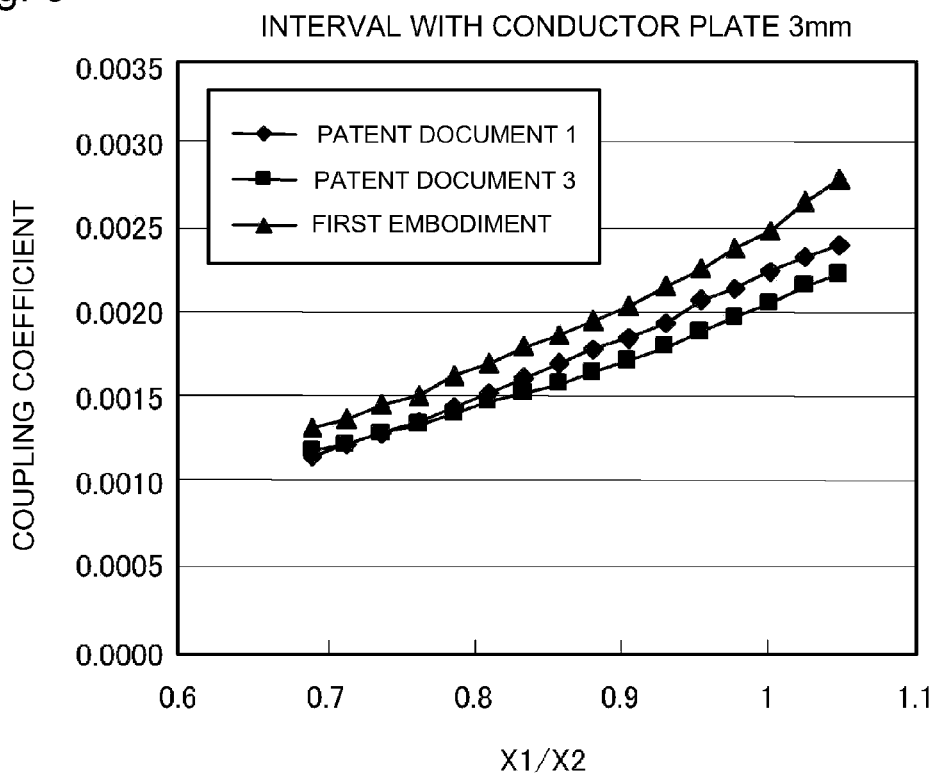
FIG. 8 shows a relation between coupling coefficient and X1/X2 when the interval between the circuit board and the antenna coil is changed.
Figure 9:
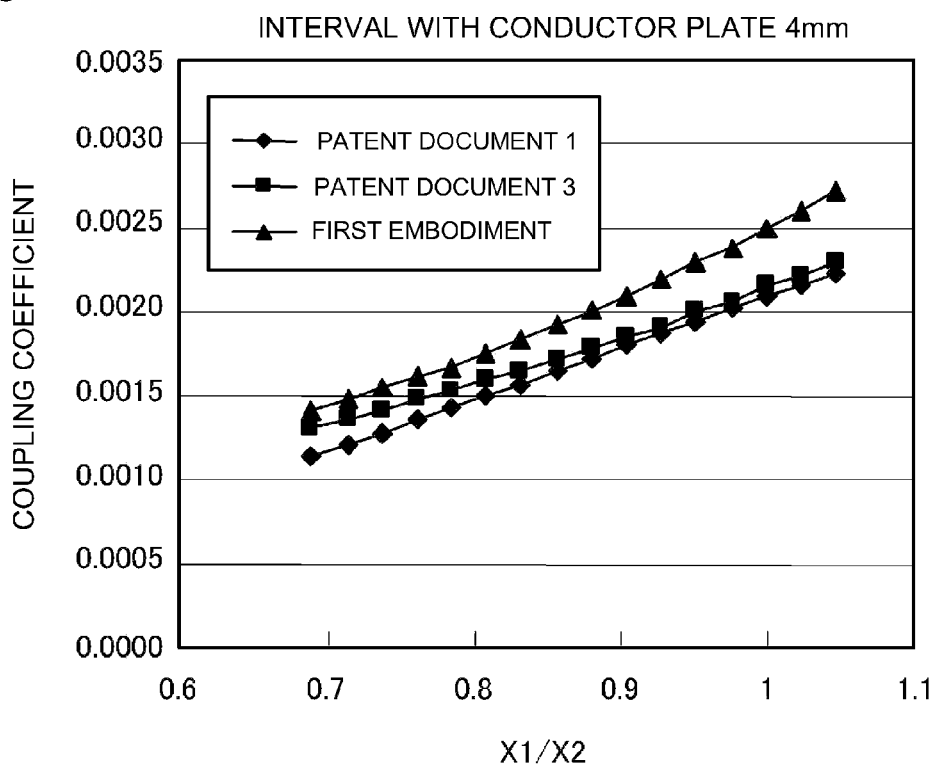
FIG. 9 shows a relation between coupling coefficient and X1/X2 when the interval between the circuit board and the antenna coil is changed.
Figure 10:
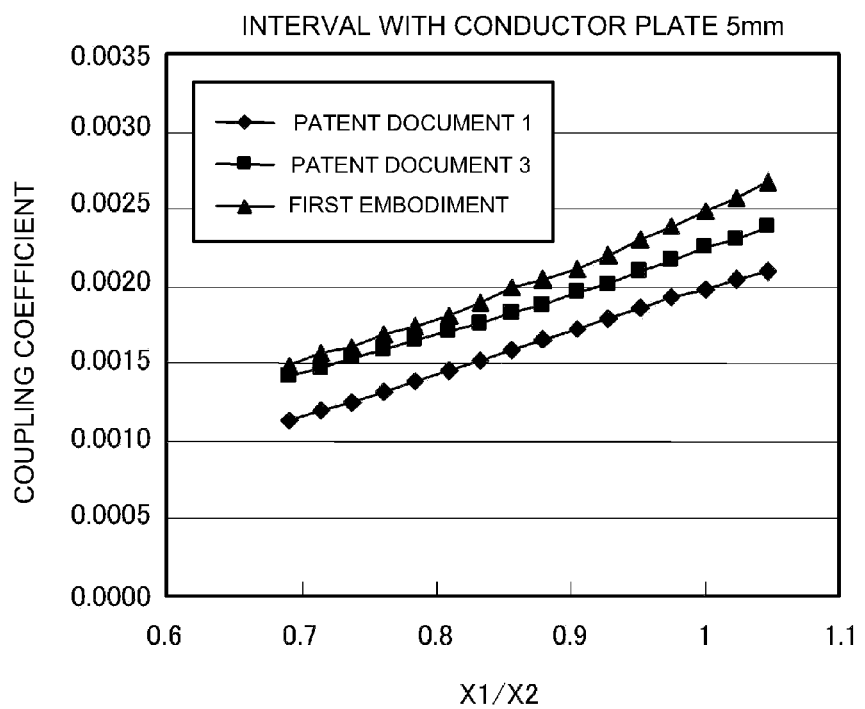
FIG. 10 shows a relation between coupling coefficient and X1/X2 when the interval between the circuit board and the antenna coil is changed.
Figure 11:
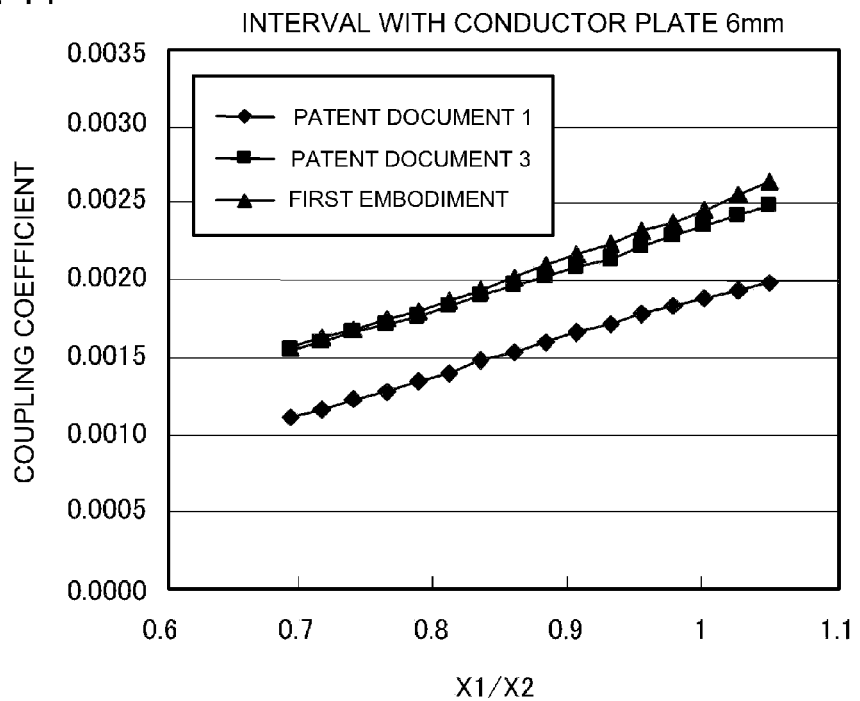
FIG. 11 shows a relation between coupling coefficient and X1/X2 when the interval between the circuit board and the antenna coil is changed.

FIGS. 4A and 4B show a magnetic flux of a partner antenna passing through the antenna device 101. In the drawings, the dashed line indicates a representative magnetic flux that contributes to coupling between the antenna device 101 and the partner antenna.

In the first coil conductor 34-1, a first conductor portion 34-11 adjacent to a first principal surface of the magnetic core 33-1 and a second conductor portion 34-12 adjacent to a second principal surface of the magnetic core 33-1 are located so as not to overlap each other in a normal direction with respect to the first or second principal surface of the magnetic core 33-1, and the second conductor portion 34-12 is located farther from the center of the circuit board 31 than the first conductor portion 34-11. Similarly, in the second coil conductor 34-2, a first conductor portion 34-21 adjacent to a first principal surface of the magnetic core 33-2 and a second conductor portion 34-22 adjacent to a second principal surface of the magnetic core 33-2 are located so as not to overlap each other in a normal direction with respect to the first or second principal surface of the magnetic core 33-2, and the second conductor portion 34-22 is located farther from the center of the circuit board 31 than the first conductor portion 34-21.

Due to such a configuration, even when the interval, or distance D between the antenna coil 91 and the circuit board 31 increases, as shown in FIG. 4A, a high rate of the magnetic flux passing through the winding centers (the conductor openings) of the coil conductors 34-1 and 34-2 can be ensured similarly as when the interval D between the antenna coil 91 and the circuit board 31 is small, as shown in FIG. 4B. Thus, deterioration of the characteristics is small.

In other words, even when the interval, or distance D between the circuit board (conductor plate) 31 and the antenna coil 91 increases, a magnetic field generated by the communication partner is easily linked with the coil, and thus deterioration of the characteristics is small. When the case of mounting in a general mobile communication terminal is considered, the interval with the conductor plate is different in every mobile communication terminal, but use of the antenna device of the invention makes it possible to obtain excellent communication performance in any mobile terminal.

FIGS. 5 to 11 each show a relation between coupling coefficient and X1/X2 when the interval between the circuit board 31 and the antenna coil 91 is changed. Here, X1 denotes the width of the antenna coil 91 shown in FIGS. 3A to 3C, and X2 denotes the width, in the crosswise direction, of the circuit board 31 shown in FIGS. 3A to 3C. In addition, a polygonal curve of triangle marks indicates a characteristic of the antenna device according to the first embodiment; a polygonal curve of rhomboid marks indicates a characteristic of an antenna device according to Patent Document 1; and a polygonal curve of square marks indicates a characteristic of an antenna device according to Patent Document 3.

From the result, it can be seen that, when X1/X2>0.7 and the interval with the conductor plate is equal to or less than 6 mm, the antenna device according to the first embodiment of the invention provides a high coupling coefficient as compared with those in the antenna devices according to Patent Documents 1 and 3.

Figure 12A:
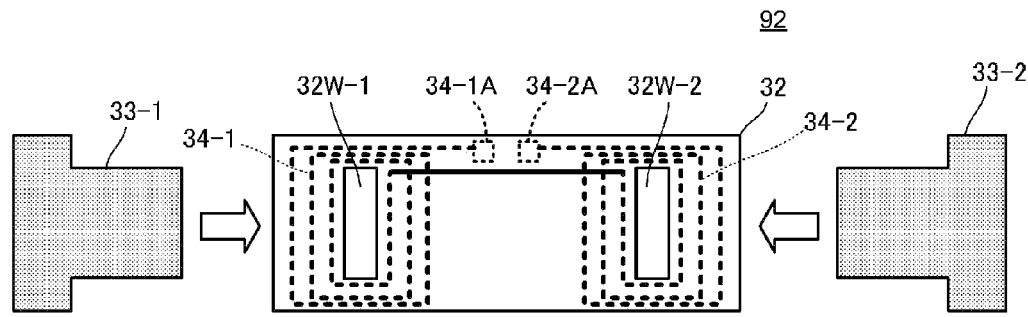
FIG. 12A is a plan view of an antenna coil that is one component of an antenna device according to a second exemplary embodiment, prior to assembling of the antenna coil.
Figure 12B:
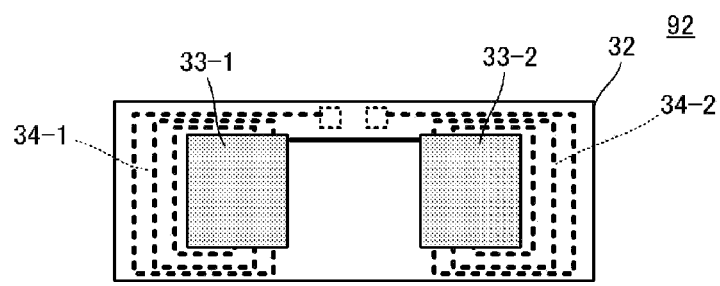
FIG. 12B is a top view of the antenna coil shown in FIG. 12A after assembly.
Figure 12C:
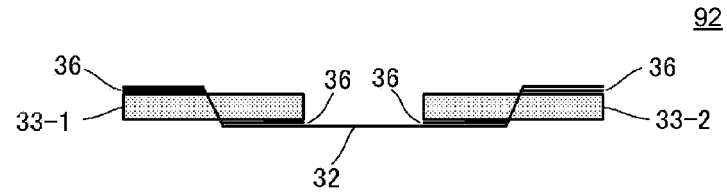
FIG. 12C is a cross-sectional view of the antenna coil shown in FIG. 12A after assembly.
Figure 12D:
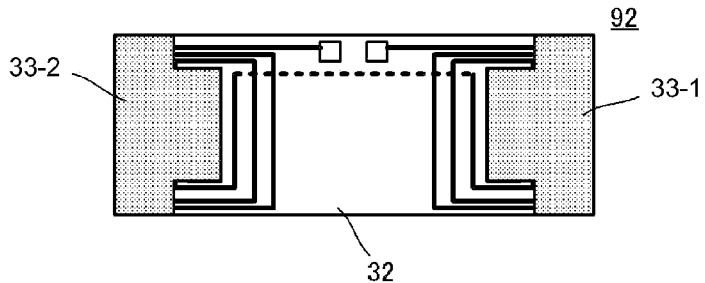
FIG. 12D is a bottom view of the antenna coil shown in FIG. 12A after assembly.

FIGS. 12A to 12D are configuration diagrams of an antenna coil 92 that is one component of an antenna device according to a second exemplary embodiment. FIG. 12A is a plan view of the antenna coil 92 prior to assembling of the antenna coil 92; FIG. 12B is a top view of the antenna coil 92; FIG. 12C is a cross-sectional view of the antenna coil 92; and FIG. 12D is a bottom view of the antenna coil 92. As shown in FIG. 12C, the magnetic cores 33-1 and 33-2 are adhered to the flexible board 32 via adhesive layers 36.

Figure 13A:
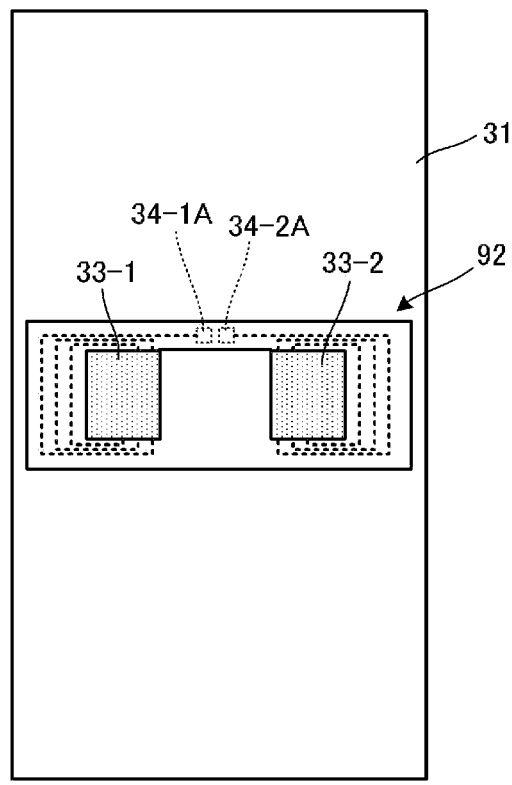
FIG. 13A is a plan view of an antenna device according to the second exemplary embodiment.
Figure 13B:
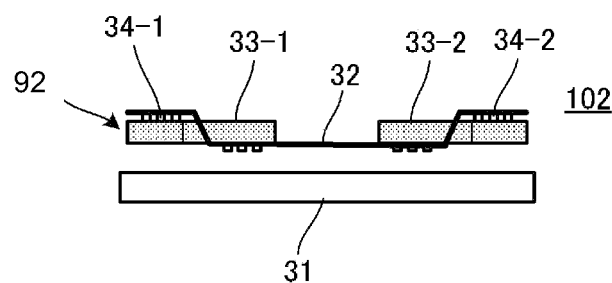
FIG. 13B is a front view of the antenna device Shown in FIG. 13A.

FIG. 13A is a plan view of the antenna device 102, and FIG. 13B is a front view of the antenna device 102.

The second exemplary embodiment differs from the first exemplary embodiment shown in FIGS. 2 to 3C, in the shapes of the magnetic cores 33-1 and 33-2. In the second embodiment, the magnetic cores 33-1 and 33-2 are thicker in plan view, or wider in cross section at edges through which a magnetic flux passes, than at the other portions thereof.

Due to this configuration, the magnetic resistance of the magnetic path decreases, and the coupling coefficient with the partner antenna increases.

Figure 14A:
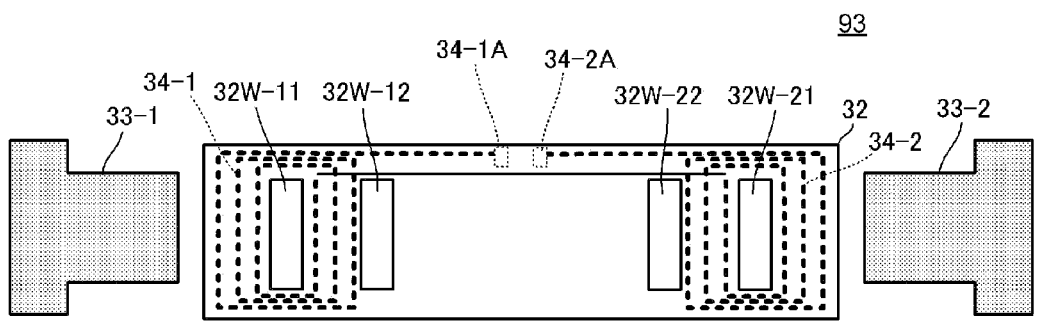
FIG. 14A is a plan view of an antenna coil that is one component of an antenna device according to a third exemplary embodiment, prior to assembling of the antenna coil.
Figure 14B:
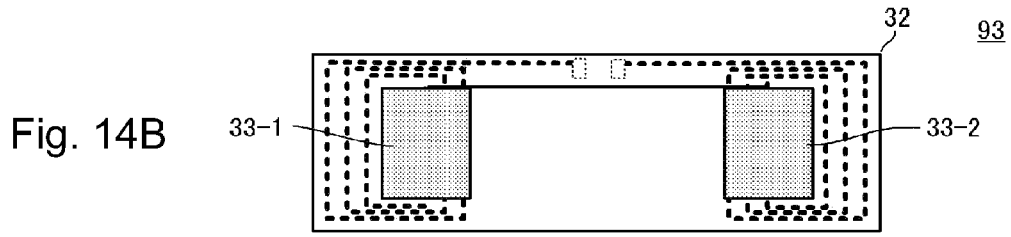
FIG. 14B is a top view of the antenna coil shown in FIG. 14A after assembly.
Figure 14C:
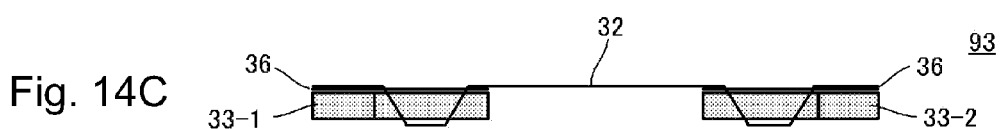
FIG. 14C is a cross-sectional view of the antenna coil shown in FIG. 14A after assembly.
Figure 14D:
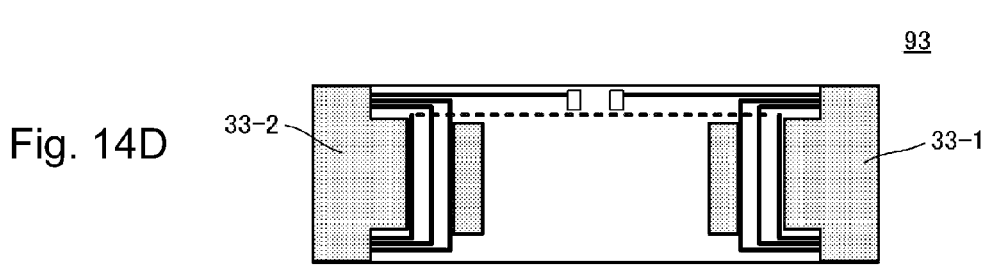
FIG. 14D is a bottom view of the antenna coil shown in FIG. 14A after assembly.

FIGS. 14A to 14D are configuration diagrams of an antenna coil 93 that is one component of an antenna device according to a third exemplary embodiment. FIG. 14A is a plan view of the antenna coil 93 prior to assembling of the antenna coil 93; FIG. 14B is a front view of the antenna coil 93; FIG. 14C is a cross-sectional view of the antenna coil 93; and FIG. 14D is a bottom view of the antenna coil 93.

The third exemplary embodiment differs from the first and second exemplary embodiments, in the shape of the flexible board 32 and the assembling structure of the magnetic cores 33-1 and 33-2 with respect to the flexible board 32.

The substantially scroll-shaped coil conductors 34-1 and 34-2 are formed on the flexible board 32, and through holes 32W-11 and 32W-21 are formed at the winding centers, respectively, of the substantially scroll-shaped coil conductors 34-1 and 34-2. In addition, through holes 32W-12 and 32W-22 are formed at positions outside, or outboard of the region where the coil conductors 34-1 and 34-2 are formed, for inserting the magnetic cores 33-1 and 33-2 therethrough.

The magnetic core 33-1 is provided so as to extend through the through hole 32W-11 from a first principal surface of the flexible board 32 and so as to extend through the through hole 32W-12 from a second principal surface of the flexible board 32. In addition, the flexible board 32 is disposed, or provided such that the first principal surface of the flexible board 32 faces the circuit board 31. Similarly, the magnetic core 33-2 is provided so as to extend through the through hole 32W-21 from the first principal surface of the flexible board 32 and so as to extend through the through hole 32W-22 from the second principal surface of the flexible board 32. In addition, the flexible board 32 is disposed, or provided such that the first principal surface of the flexible board 32 faces the circuit board 31.

Referring to FIG. 14C, the magnetic cores 33-1 and 33-2 are adhered to the flexible board 32 via the adhesive layers 36. Due to this configuration, the adhesion between the flexible board 32 and each of the magnetic cores 33-1 and 33-2 can be achieved by the single adhesive layer 36, and thus the cost of parts such as double-sided adhesive tape can be reduced.

Figure 15A:
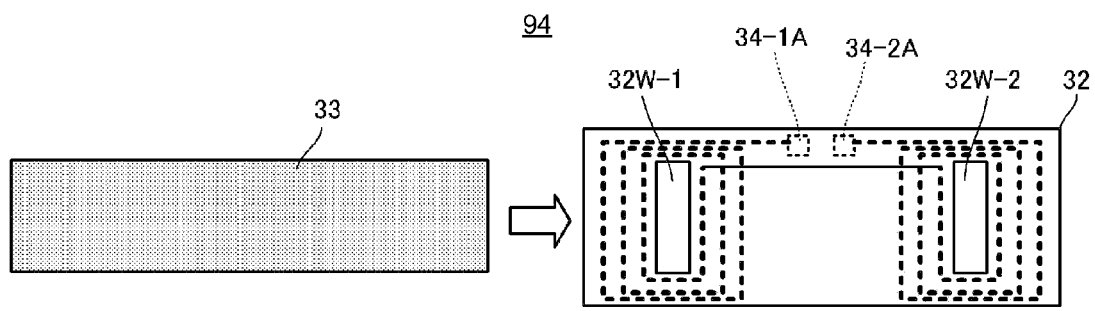
FIG. 15A is a plan view of an antenna coil that is one component of an antenna device according to a fourth exemplary embodiment, prior to assembling of the antenna coil.
Figure 15B:
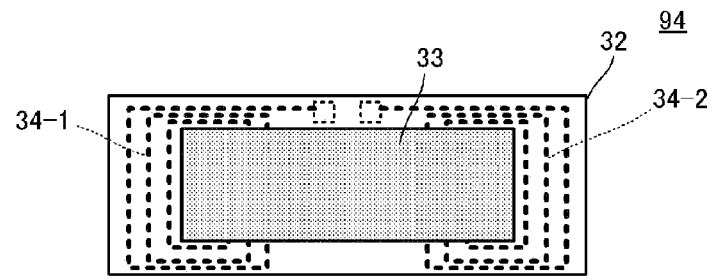
FIG. 15B is a top view of the antenna coil shown in FIG. 15A after assembly.
Figure 15C:
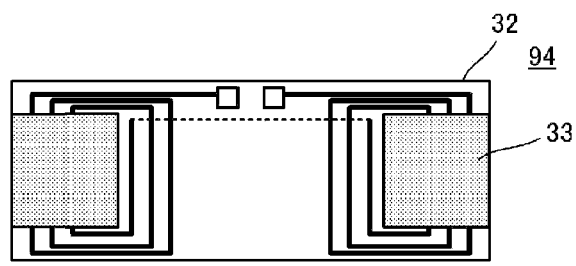
FIG. 15C is a bottom view of the antenna coil shown in FIG. 15A after assembly.

FIGS. 15A to 15C are configuration diagrams of an antenna coil 94 that is one component of an antenna device according to a fourth exemplary embodiment. FIG. 15A is a plan view of the antenna coil 94 prior to assembling of the antenna coil 94; FIG. 15B is a top view of the antenna coil 94; and FIG. 15C is a bottom view of the antenna coil 94.

In the fourth exemplary embodiment, a single magnetic core 33 is provided with the flexible board 32. The structure of the flexible board 32 can be the same as that in the first exemplary embodiment. The magnetic core 33 is provided so as to extend through the through hole 32W-1 from the first principal surface of the flexible board 32 and so as to extend through the through hole 32W-2 from the second principal surface of the flexible board 32. The flexible board 32 is disposed, or provided such that the first principal surface of the flexible board 32 faces the circuit board 31.

Due to this configuration, the number of parts is reduced, and thus the manufacturing cost and the parts cost can be reduced.

Figure 16A:
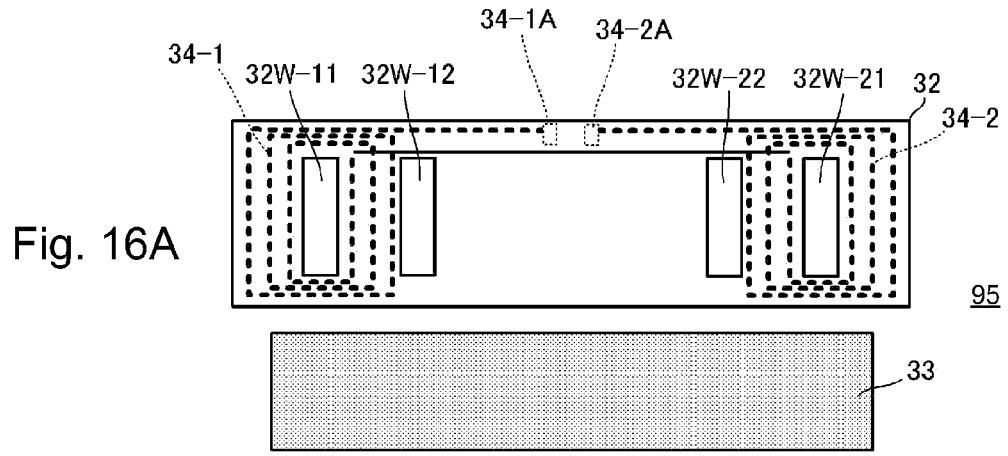
FIG. 16A is a plan view of an antenna coil that is one component of an antenna device according to a fifth exemplary embodiment, prior to assembling of the antenna coil.
Figure 16B:
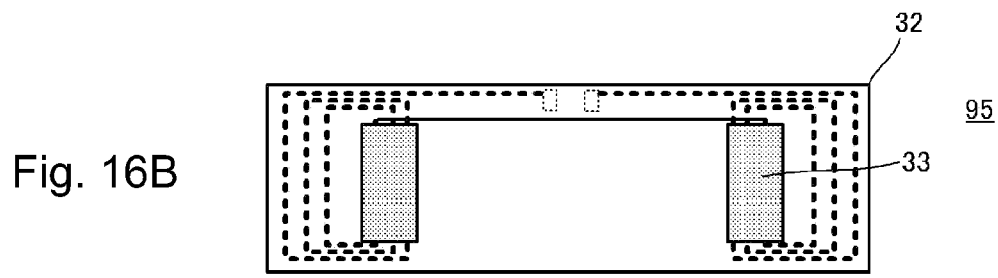
FIG. 16B is a top view of the antenna coil shown in FIG. 16A after assembly.
Figure 16C:
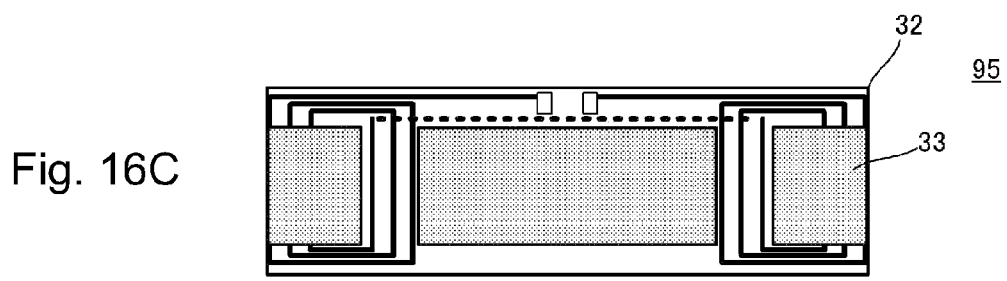
FIG. 16C is a bottom view of the antenna coil shown in FIG. 16A after assembly.

FIGS. 16A to 16C are configuration diagrams of an antenna coil 95 that is one component of an antenna device according to a fifth exemplary embodiment. FIG. 16A is a plan view of the antenna coil 95 prior to assembling of the antenna coil 95; FIG. 16B is a top view of the antenna coil 95; and FIG. 16C is a bottom view of the antenna coil 95.

In the fifth embodiment, the single magnetic core 33 is provided. The structure of the flexible board 32 can be the same as that in the third exemplary embodiment.

The magnetic core 33 is provided so as to extend through the through hole 32W-11 from the first principal surface of the flexible board 32, so as to extend through the through hole 32W-12 from the second principal surface of the flexible board 32, so as to extend through the through hole 32W-22 from the first principal surface of the flexible board 32, and so as to extend through the through hole 32W-21 from the second principal surface of the flexible board 32. In addition, the flexible board 32 is disposed, or provided such that the first principal surface of the flexible board 32 faces the circuit board 31.

Due to this configuration, the number of parts is reduced, and thus the manufacturing cost and the parts cost can be reduced.

Embodiments of an antenna device according to the claimed invention can provide an antenna coil that easily links with a magnetic field radiated from an antenna of a communication partner. Thus, an antenna device can be configured to have small characteristic deterioration caused by a change or variation of the interval between a conductor plate and an antenna coil.

Accordingly, embodiments of an antenna device consistent with the claimed invention can provide an antenna device that can be configured to ensure a high coupling coefficient even when the interval between a conductor plate and an antenna coil increases.

Although a limited number of exemplary embodiments of the invention have been described above, it is to be understood that variations and modifications will be apparent to those skilled in the art without departing from the scope and spirit of the invention. The scope of the invention, therefore, is to be determined solely by the following claims and their equivalents.

What is claimed is:

1. An antenna coil, comprising:
a first coil conductor that is formed in a spirally wound shape and has a conductor opening portion at the center of winding;
a second coil conductor that is formed in a spirally wound shape and has a conductor opening portion at the center of winding; and
a magnetic core that is inserted through each of the conductor opening portion of the first coil conductor and the conductor opening portion of the second coil conductor, the magnetic core having a first principal surface and a second principal surface, the first principal surface and the second principal surface being surfaces opposite to each other;
wherein each of the first coil conductor and the second coil conductor has a first conductor portion and a second conductor portion that are located at respective positions in such a way that the first conductor portion and the second conductor portion do not overlap each other as viewed in a direction of a line that is normal to the first principal surface or the second principal surface of the magnetic core, the first conductor portion being formed in the vicinity of the first principal surface of the magnetic core, and the second conductor portion being formed in the vicinity of the second principal surface of the magnetic core,
an area where the first coil conductor is formed and an area where the second coil conductor is formed are located at respective positions in such a way that the area of the first coil conductor and the area of the second coil conductor do not overlap each other as viewed in the direction of the line that is normal to the first principal surface or the second principal surface of the magnetic core, and
each of the second conductor portion of the first coil conductor and the second conductor portion of the second coil conductor is relatively close to an end of an external shape of the area where the first coil conductor and the second coil conductor are formed as compared with the corresponding first conductor portion.

2. The antenna coil according to claim 1, wherein the magnetic core has a structure in which an end where a magnetic flux goes in and out is thicker than the other portions thereof.

3. The antenna coil according to claim 1, wherein the first coil conductor and the second coil conductor are formed on a flexible substrate.

4. The antenna coil according to claim 3, wherein the flexible substrate has a conductor-opening-portion-side through hole and an outside-of-coil-conductor-formation-area through hole, the conductor-opening-portion-side through hole being formed in the conductor opening portion of one of the first and second coil conductors, the magnetic core being inserted through the conductor-opening-portion-side through hole, the outside-of-coil-conductor-formation-area through hole being formed outside the area where the first and second coil conductors are formed, the magnetic core being inserted through the outside-of-coil-conductor-formation-area through hole, and the magnetic core is provided in a state of each being inserted from a first principal surface of the flexible substrate through the conductor-opening-portion-side through hole and from a second principal surface of the flexible substrate through the outside-of-coil-conductor-formation-area through hole.

5. The antenna coil according to claim 1, wherein the magnetic core that is inserted through the conductor opening portion of the first coil conductor and the magnetic core that is inserted through the conductor opening portion of the second coil conductor make up a single magnetic core.

* * * * *